United States Patent

Nakatsukasa et al.

[11] Patent Number: 6,119,301
[45] Date of Patent: Sep. 19, 2000

[54] WIPER DEVICE INCLUDING COVER

[75] Inventors: Tetsuya Nakatsukasa, Okazaki; Toshiyuki Shibata, Hamana-gun; Nobuaki Kinoshita, Toyohashi, all of Japan

[73] Assignee: ASMO Co., Ltd., Japan

[21] Appl. No.: 09/206,950

[22] Filed: Dec. 8, 1998

[30] Foreign Application Priority Data

| Dec. 11, 1997 | [JP] | Japan | 9-341717 |
| Dec. 12, 1997 | [JP] | Japan | 9-342690 |
| Dec. 18, 1997 | [JP] | Japan | 9-349662 |
| Sep. 30, 1998 | [JP] | Japan | 10-278598 |
| Oct. 12, 1998 | [JP] | Japan | 10-289761 |

[51] Int. Cl.[7] .................. B60S 1/32; B60S 1/36
[52] U.S. Cl. .................. 15/250.21; 15/250.351; 296/96.15
[58] Field of Search .......... 15/250.21, 250.23, 15/250.351, 250.352, 250.201, 250.16, 250.19; 296/96.15, 96.17

[56] References Cited

U.S. PATENT DOCUMENTS 5,495,637  3/1996  Egner-Walter .......... 15/250.351
5,860,186  1/1999  Schael et al. .......... 15/250.21

FOREIGN PATENT DOCUMENTS 0182123   5/1986  European Pat. Off. .
537059    4/1993  European Pat. Off. .......... 15/250.21
10-507143 7/1998  Japan .
96/11824  4/1996  WIPO .

*Primary Examiner*—Gary K. Graham
*Attorney, Agent, or Firm*—Parkhurst & Wendel, L.L.P.

[57] ABSTRACT

An object of this invention is to provide a wiper device of a vehicle capable of preventing foreign matter from being caught in a link mechanism of a four-articulation link system type wiper arm, capable of maintaining its function under severe conditions and of being realized through a simple structure at low cost. This wiper device of the vehicle is of the four-articulation link system in which a main lever and a sub lever are each connected to an arm head. A cover member is mounted on the arm head with engaging pieces and engaging concave portions. The cover member covers a link mechanism portion. A mesh-like rib is formed at a back side of the cover member so as to improve rigidity. As a result, it is possible to block penetration of snow or the like and remove (wipe off) accumulated snow and formed ice by force, thereby preventing an increase in the accumulated snow.

23 Claims, 15 Drawing Sheets

WIPER DEVICE INCLUDING COVER

BACKGROUND OF THE INVENTION

1. Field of the Invention

The present invention relates to a wiper device which wipes a glass surface such as a windshield glass of a vehicle.

2. Description of the Related Art

A wiper device for wiping a windshield glass or the like of a vehicle comprises a wiper arm and a wiper blade held by a wiper arm.

In the wiper arm, an end portion of an arm head is fixed to a pivot shaft and a retainer is connected to the other end portion of the arm head so as to be pivotable with respect to a predetermined angle. A spring is provided between the arm head and retainer so as to constantly urge the retainer toward a wiping object surface such as a windshield glass. An arm piece is fixed to a front end portion of the retainer. A front end portion of the arm piece is bent in the form of a substantially U shape and holds the wiper blade. On the other hand, the wiper blade comprises a blade rubber which is in contact with the wiping object surface for wiping it and a plurality of holding levers for holding this blade rubber.

When the wiper device is actuated, the wiper arm and wiper blade rotate by reciprocation, so that the blade rubber moves on the windshield glass while closely contacting the glass, so as to wipe off rain drops.

As the wiper device of a vehicle, currently a wide range wiping type having an expandable wiper arm has been proposed to eliminate as far as possible regions left unwiped in the entire range of the windshield glass (enlarge the wiping range). Further, as one example of this wide range wiping type, a wiper device provided with a wiper arm called a four-articulation link system has been particularly well known (as an example, EP0182123).

This wiper device of the vehicle having a wiper arm called the four-articulation link system includes a main lever (first lever) and a sub lever (second lever) acting as a pair. The main lever is connected to and fixed to a pivot shaft and the sub lever is supported, such that rotation is possible, by a supporting shaft provided at a position set a predetermined distance apart from the pivot shaft. Further, the main lever and the sub lever are disposed in parallel and an arm head (third lever) is rotatably connected to a front end of each.

If the main lever rotates with the pivot shaft, the arm head linked with the sub lever rotates such that it approaches or leaves with respect to the pivot shaft and as a result, the entire length of the wiper arm expands or contracts. As a result, the entire length of the wiper arm apparently expands at a predetermined wiping position so as to expand the wiping range. Therefore, in a case wherein a windshield glass the longitudinal dimension of which is set relatively long is wiped, as compared to a wiper device (wiper device in which the arm head is directly fixed to the pivot shaft and the wiper arm and wiper blade simply rotate by reciprocation around the pivot shaft) provided with an ordinary wiper arm, it is difficult for unwiped regions to remain in the entire range of the windshield glass.

In the wiper device of the vehicle having a wiper arm of this kind of the four-articulation link system, the main lever and sub lever disposed in parallel and rotating as described above, and the arm head to which they are attached, together form a link mechanism. If snow or the like adheres to or remains at a traveling range of this link mechanism, it becomes a cause for obstructing a smooth operation of the wiper device. Thus, it is necessary to take measures to prevent snow from remaining and prevent the amount of snow that has entered from increasing. Particularly, it is necessary to take measures to prevent foreign matter such as a bough from entering the link mechanism without being prepared for it.

Covering all of the aforementioned levers with an engine hood of a vehicle so that they are not exposed to the outside can be considered, but because the main lever and the sub lever and further the arm head linked therewith move over a relatively wide range, it is difficult to secure such a traveling space within the engine hood and to cover the entire range completely.

SUMMARY OF THE INVENTION

Accordingly, in view of the circumstances described above, an object of the present invention is to provide a wiper device of a vehicle capable of preventing snow or the like from remaining and foreign matter from being caught in a link mechanism of a wiper arm of a four-articulation link system comprising a main lever, a sub lever and an arm head linked to both, further capable of maintaining its function under severe conditions like during snow fall and capable of being realized through a simple structure at a low cost.

To achieve the above object, in accordance with a first aspect of the present invention, there is provided a wiper device of a vehicle comprising a main lever which is linked with a rotation shaft provided on a vehicle body and which rotates with the rotation shaft, a sub lever axially supported, such that rotation is possible, by a supporting shaft provided on the vehicle body at a position set apart from the rotation shaft by a predetermined distance, an arm head linked with a distal end of the main lever and with a distal end of the sub lever such that rotation is possible with respect to each and the levers form a four-articulation link system, and a wiper arm linked with the arm head and having a wiper blade connected to its distal end, the wiper device further comprising a cover member to be mounted on the arm head, and the cover member including a mounting portion to be mounted on the arm head and a covering portion which extends from the mounting portion toward just above the main lever and the sub lever and at which a rib is formed at a back side thereof.

In the wiper device of a vehicle in accordance with the first aspect of the present invention, the main lever is fixedly connected to the rotation shaft and the sub lever is axially supported, such that rotation is possible, by a supporting shaft provided at a position set apart from the rotation shaft by a predetermined distance. The main lever and the sub lever are disposed in parallel and the arm head is linked to a distal end of each such that rotation is possible with respect to each.

If the main lever rotates with the rotation shaft, the arm head linked with the sub lever rotates such that it approaches or leaves with respect to the rotation shaft and consequently, the entire length of the wiper arm expands or contracts. As a result, the entire length of the wiper arm apparently expands at a predetermined position thereby expanding its wiping range. Therefore, as compared to a wiper device provided with an ordinary wiper arm, it is difficult for unwiped regions to remain within the entire range of the windshield glass.

In a preferred embodiment in accordance with the first aspect of the present invention, the rib at a back side of the aforementioned cover member is formed in the form of a mesh.

In the wiper device of a vehicle in the present embodiment accordance with the first aspect of the present invention, because the mesh-like rib is formed at the back of the cover member, rigidity of the cover member is improved. Even if snow accumulates or ice forms in the vicinity of the link mechanism below the rear end of the engine hood of a vehicle, the cover member having such a high rigidity rotates to wipe off the accumulated snow with the aforementioned mesh-like rib, thereby preventing a further increase in the snow. Therefore, a case in which the covering portion of the cover member is pushed by the accumulated snow or formed ice from the back does not occur.

In another preferred embodiment in accordance with the first aspect of the present invention, a wiper device of a vehicle according to claim 1, wherein the cover member covers a traveling range of the main lever and the sub lever and comprises a first cover portion that overlaps with a lower portion of a hood of the vehicle in a state in which the device is stopped and a second cover portion extending beyond the hood of the vehicle to cover the arm head and the traveling range of the main lever and the sub lever, the first cover portion and the second cover portion being formed continuously with each other with a step portion provided therebetween, such that in a state in which the device is stopped, a gap between the first cover portion and the hood of the vehicle is set by the step portion.

Thus, if there is a possibility that snow or the like may attach to or stay in the traveling range of the link mechanism comprising the main lever, the sub lever and the arm head, this phenomenon is prevented by the cover member. Therefore, it never becomes a cause for obstructing a smooth operation of the link mechanism or the wiper device. Further, it is possible to prevent foreign matter such as a bough from entering the link mechanism.

In the state in which the wiper device is stopped, the gap between the first cover and the hood of the vehicle is set by the step portion.

Therefore, in case the four-articulation link system is employed in a vehicle of a different type (i.e., a vehicle having a different hood or shape), by setting the formation position of the step portion of the cover member or its height, it is possible to prevent foreign matter from entering the gap between the vehicle hood and the four-articulation link system, and to prevent snow or ice from remaining in the gap.

As described above, in the wiper device of a vehicle in accordance with the first aspect of the present invention, it is possible to prevent foreign matter from being caught in the aforementioned link mechanism of the wiper arm of the four-articulation link system comprising the main lever, the sub lever and the arm head linked therewith and to prevent snow, ice or the like from remaining or accumulating further.

In still another preferred embodiment in accordance with the first aspect of the present invention, a wiper device of a vehicle according to claim 3, wherein the second cover portion is formed with the step portion relative to the first cover portion such that in a state in which the device is stopped, the second cover portion is flush with the hood of the vehicle at substantially the same height.

In the wiper device of the present embodiment in accordance with the first aspect of the present invention, in the state in which the wiper device is stopped, the second cover portion is formed with the step portion with respect to the first cover portion so that the second cover portion is flush with the hood of the vehicle at substantially the same height. Therefore, the gap relative to the hood of the vehicle is further reduced. Particularly in the state in which the wiper device is stopped, snow, ice or the like on the cover member drops continuously to the hood of the vehicle flush with the cover member, thereby preventing snow, ice or the like from entering the gap between the hood of the vehicle and the cover member.

In another preferred embodiment in accordance with the first aspect of the present invention, a wiper device of a vehicle according to claim 1, wherein the cover portion covers at least an uncovered range not covered by the hood of the vehicle, of the traveling range of the main lever and the sub lever.

Therefore, even if snow or the like is about to adhere to or remain in the traveling range of the link mechanism comprising the main lever, the sub lever and the arm head, this phenomenon is prevented by the cover member. Therefore, it never becomes a cause for obstructing a smooth operation of the link mechanism or the wiper device. Further, it is possible to prevent foreign matter such as a bough from entering in the traveling range of the link mechanism.

In another preferred embodiment in accordance with the first aspect of the present invention, a wiper device of a vehicle according to claim 1, wherein the device contains a plurality of engaging pieces that elastically engage with the arm head.

In another preferred embodiment in accordance with the first aspect of the present invention, a wiper device of a vehicle according to claim 6, wherein the plurality of the engaging pieces are disposed such that they do not oppose each other.

In another preferred embodiment in accordance with the first aspect of the present invention, a wiper device of a vehicle according to claim 7, wherein the plurality of the engaging pieces are disposed in a staggered arrangement in a longitudinal direction of the arm head such that they do not oppose each other.

Therefore, a stabilized mounted state can be secured with a small number of the engaging pieces provided in the longitudinal direction of the arm head. The cost of this cover member is low because it is a simple structure provided on the arm head. Further, this is not a fixed cover unlike the engine hood. The cover member moves with the wiping action in the state in which it is fixed to the arm head. Therefore, it is possible to cover the traveling range of the link mechanism with this kind of a small cover.

In another preferred embodiment in accordance with the first aspect of the present invention, a wiper device of a vehicle according to claim 6, wherein the engaging pieces are provided so as to be upright and separate from ordinary peripheral walls of the device at positions that are inward with respect to the ordinary peripheral walls.

In the wiper device of a vehicle of the present embodiment in accordance with the first aspect of the present invention, because the engaging pieces are provided so as to be upright and separate from the ordinary peripheral walls of the device at positions that are inward with respect to the ordinary peripheral walls, when the cover member (mounting portion) is mounted, the engaging pieces are deformed easily so that they engage with the arm head. Thus, assembly performance of the cover member is improved.

On the other hand, if the covering portion is pushed up by ice or the like so that a couple of forces (force with intent to remove the mounting portion from the arm head) acts on the ordinary peripheral walls of the mounting portion, it is difficult for this couple of forces to be transmitted to the engaging pieces which are provided so as to be upright and separate. Therefore, it is difficult for the engaging pieces to become disengaged from the arm head. Thus, it is difficult for the mounting portion or the cover member to be released from the arm head.

In another preferred embodiment of the present invention, the wiper device of a vehicle described above a wiper device of a vehicle according to claim 9 further comprising a stopper member for preventing the engaging pieces from becoming warped in such a direction that they become disengaged from the arm head.

In the wiper device of a vehicle of the present embodiment in accordance with the first aspect of the present invention, the mounting portion of the cover member is provided with the stopper member so as to prevent the engaging pieces from becoming warped in such a direction that they become disengaged from the arm head. Therefore, the mounting portion or the cover member never slips out from the arm head undesirably.

In accordance with a second aspect of the present invention, there is provided a wiper device of a vehicle comprising a main lever which is linked with a rotation shaft provided on a vehicle body and which rotates with the rotation shaft, a sub lever axially supported such that rotation is possible by a supporting shaft provided on the vehicle body at a position set apart from the rotation shaft by a predetermined distance, an arm head linked with a distal end of the main lever and with a distal end of the sub lever such that each of them is rotatable and the levers form a four-articulation link system, and a wiper arm linked with the arm head and having a wiper blade connected to its distal end, the wiper device further comprising a cover member to be mounted on the arm head, the cover member comprising a first cover portion and a second cover portion, where the first cover portion covers a traveling range of the main lever and the sub lever and overlaps with a lower portion of a hood of the vehicle in a state in which the device is stopped and the second cover portion extends beyond the hood of the vehicle to cover, together with the first cover portion, the arm head and the traveling range of the main lever and the sub lever, and the first cover portion and the second cover portion being formed continuously with each other with a step portion provided therebetween, such that in a state in which the device is stopped, a gap between the first cover portion and the hood of the vehicle is set by the step portion.

Further, in a accordance with a third aspect of the present invention, there is provided a wiper device of a vehicle comprising a main lever which is linked with a rotation shaft provided on a vehicle body and which rotates with the rotation shaft, a sub lever axially supported such that rotation is possible by a supporting shaft provided on the vehicle body at a position set apart from the rotation shaft by a predetermined distance, an arm head linked with a distal end of the main lever and with a distal end of the sub lever such that each of them is rotatable and the levers form a four-articulation link system, and a wiper arm linked with the arm head and having a wiper blade connected to its distal end, the wiper device having a cover member including a mounting portion to be mounted on the arm head and a covering portion extending from the mounting portion toward just above the main lever and the sub lever so as to cover the main lever and the sub lever, and the mounting portion including a plurality of engaging pieces elastically engaging with the arm head, the engaging pieces being disposed such that they do not oppose each other.

Further, in a preferred embodiment in accordance with the third aspect of the present invention, a wiper device of a vehicle according to claim 20, wherein the stopper member comprises a pair of fitting portions, one thereof being fitted in a closely contacting state in between an ordinary peripheral wall of the mounting portion and the engaging pieces located at a side of the covering positions, the other thereof being fitted in a closely contacting state in between an ordinary peripheral wall of the mounting portion and the engaging pieces located at a side opposite to the covering portion; and a connecting portion for linking the pair of fitting portions; the stopper member acting as a pinching stopper formed so as to have a substantially U-shaped cross section, pinching the arm head integrally with the engaging pieces.

In the wiper device of a vehicle in the present embodiment in accordance with the third aspect of the present invention, the pinching stopper as a stopper member comprises the pair of the fitting portions and the connecting portion for linking the fitting portions and is so as to have a substantially U-shaped cross section. This pair of the fitting portions are fitted in between the engaging pieces and the ordinary peripheral walls of the mounting portion so as to pinch the arm head integrally with the engaging pieces.

Therefore, the engaging pieces are held by force in a state wherein they are engaged with the arm head. Consequently, there never occurs a case in which the mounting portion or the cover member slips out of the arm head unexpectedly.

Further, in accordance with a fourth aspect of the present invention, there is provided a wiper device of a vehicle including: a first wiper comprising a main lever which is linked with a rotation shaft provided on a vehicle body and which rotates with the rotation shaft, a sub lever axially supported, such that rotations is possible by a supporting shaft provided on the vehicle body at a position set apart from the rotation shaft by a predetermined distance, an arm head linked with a distal end of the main lever and with a distal end of the sub lever such that rotation is possible with respect to each, the levers form a four-articulation link system, and a wiper arm linked with the arm head and having a wiper blade connected to its distal end; a second wiper which is linked with a second rotation shaft which is provided on the vehicle body separately from the rotation shaft and which rotates synchronously with the rotation shaft; the arm head of the first wiper being located in the direction in which the second wiper is closed, when the second wiper is located at a lower inverted position thereof, and the cover member being mounted on the arm head of the first wiper so as to cover the four-articulation link system, the cover member comprising an extension portion formed by extending a side wall opposing the second wiper of the cover member further than the other side walls in the lower inverted position.

In the wiper device of a vehicle in accordance with the fourth aspect of the present invention, a so-called tandem type wiper is employed in which two wiper arms and wiper blades are disposed in the transverse direction of the vehicle so as to wipe synchronously with each other and the four-articulation link system is disposed at a lower inverted position in a closing direction of the second wiper blade. Thus, even if rain water wiped off by the second wiper blade is splashed on the side wall of the link mechanism portion, it is possible to prevent the rain water from being splashed directly on the connecting portion between each of the levers and the arm head.

In the wiper device of a vehicle in accordance with the fourth aspect of the present invention, a connecting shaft is connected to each of the main lever and the sub lever at the step portion formed so as to be raised toward the arm head and the cover member has the extension portion the side wall of which extends to the main lever and/or the sub lever. This extension portion covers at least the rotation shafts on the rotationary portion of each lever and the connecting shaft, and/or a portion opposite to the supporting shaft.

Therefore, the extension portion of the cover member extends so as to cover in the range of the rotation shafts on the rotationary portion of each lever and the connecting shaft and/or a portion opposite to the supporting shaft (side without the hood of the vehicle), and further, the step portion is formed at the side of the main lever and/or the sub lever such that it protrudes toward the arm head. Thus, the respective levers and the rotationary portion of the connecting shaft can be disposed in a state wherein they have entered the cover member. Thus, flow of grease from the connecting portion due to water splashing on the link mechanism and penetration of muddy water can be prevented, thereby contributing to extended service life of the connecting portion. Thus, a smooth operation of the link mechanism can be maintained.

In the wiper device of a vehicle in accordance with the fourth aspect of the present invention, it is possible to prevent snow or the like from remaining or to prevent foreign matter from being caught in the link mechanism of the four-articulation link system wiper arm comprising the main lever, the sub lever and the arm head and further waterproof the linked rotation portion between each of the levers and the arm head. Further, this can be achieved through a simple structure at low cost.

DESCRIPTION OF THE PREFERRED EMBODIMENTS

Figure 4:
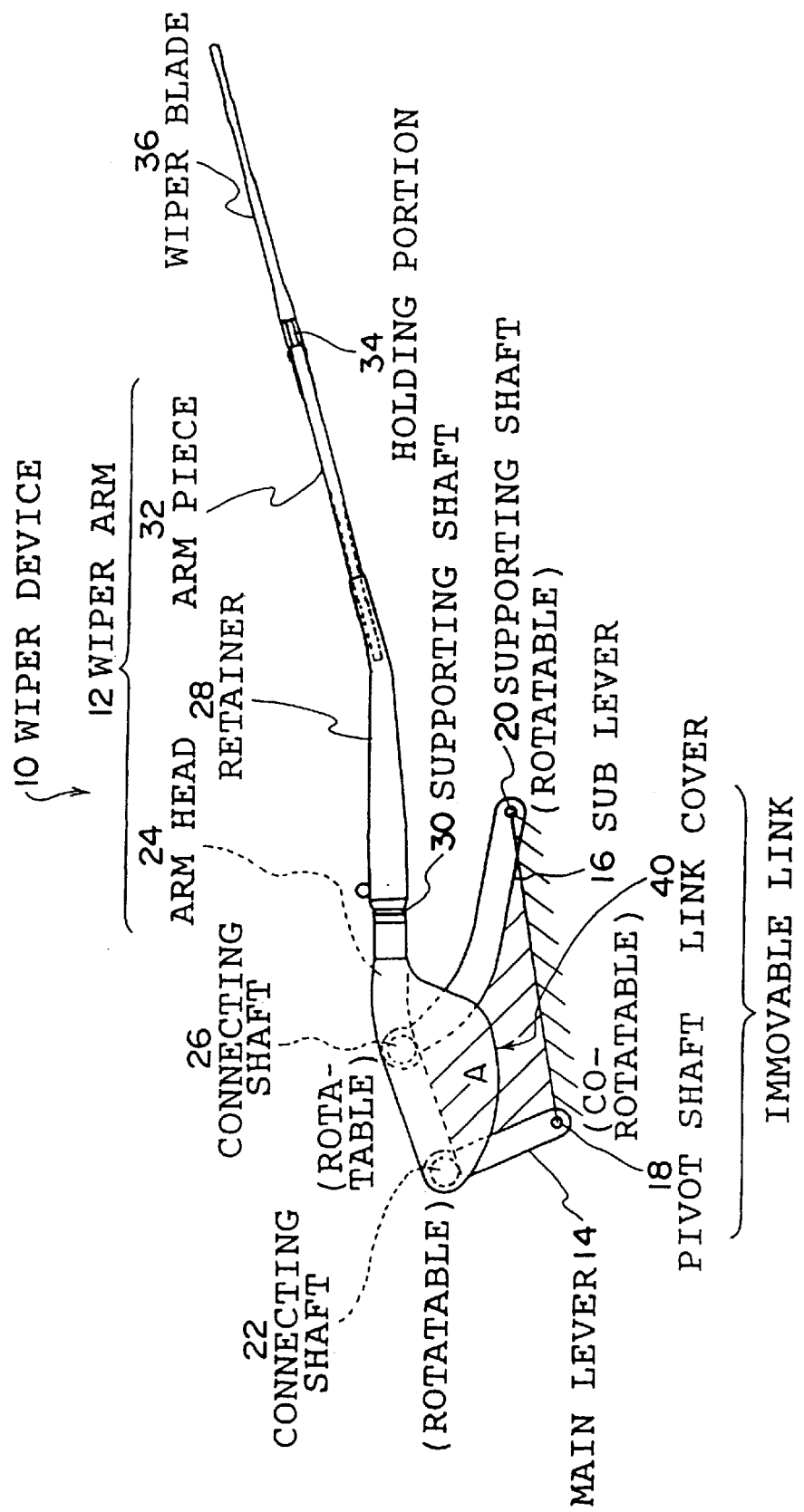
FIG. 4 is a plan view showing an entire structure of the wiper device according to the first embodiment of the present invention.
Figure 5:
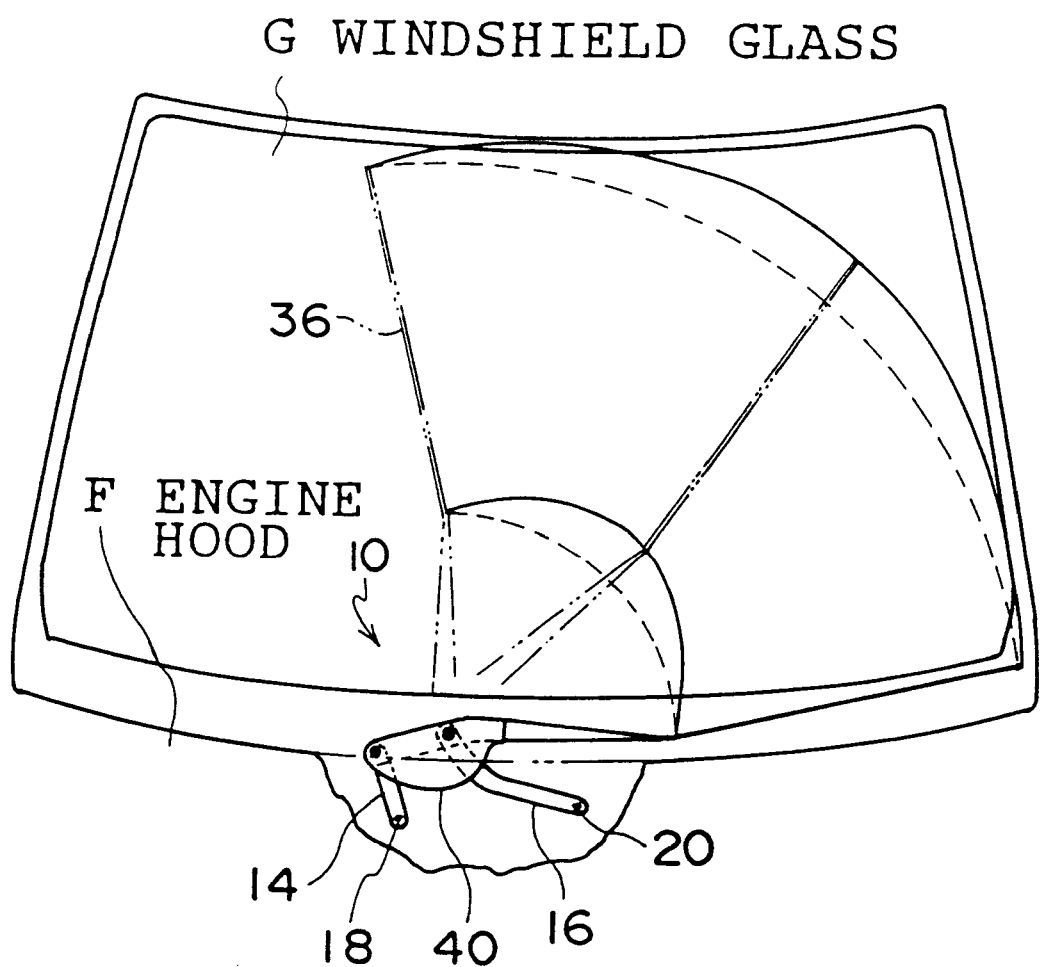
FIG. 5 is a front view showing a state in which the wiper device according to the first embodiment of the present invention is applied to a vehicle.
Figure 6:
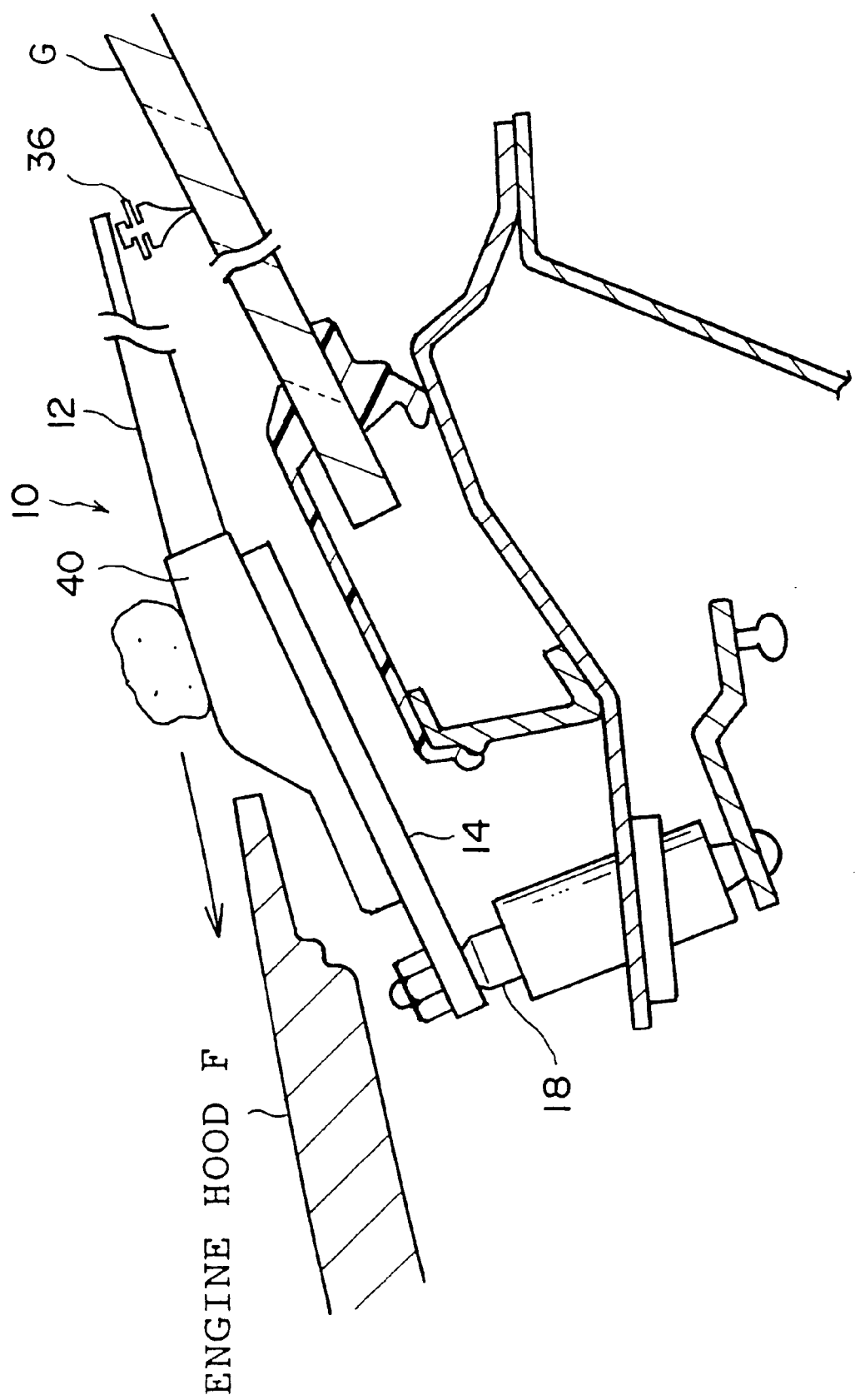
FIG. 6 is a sectional view showing a state in which the wiper device according to the first embodiment of the present invention is applied to a vehicle.

FIG. 4 shows an entire structure of a wiper device of a vehicle according to a first embodiment of the present invention. FIG. 5 shows a wiper device 10 applied to a vehicle in a front view of the vehicle and FIG. 6 shows a wiper device applied to the vehicle in a sectional view.

The wiper device 10 comprises a wiper arm 12 and a wiper blade 36 held by this wiper arm 12.

The wiper arm 12 includes a main lever 14 and a sub lever 16. An end portion of the main lever 14 is fixed to a pivot shaft 18 acting as a rotation shaft provided on a vehicle and always rotates with the pivot shaft 18. The sub lever 16 is supported rotatably by a supporting shaft 20 provided at a position set a predetermined distance apart from the pivot shaft 18. A vehicle body or frame between this pivot shaft 18 and supporting shaft 20 forms an immovable link. The main lever 14 and the sub lever 16 are disposed in parallel and an arm head 24 is rotatably connected to a distal end portion of the main lever 14 via a connecting shaft 22. A front end portion of the sub lever 16 is connected to the arm head 24 such that the arm head 24 is rotatable via a connecting shaft 26.

At the other end portion of the arm head 24 is connected via a supporting shaft a retainer 28 helping to form the wiper arm 12, so as to be rotatable by a predetermined angle in a direction of approaching or leaving the windshield glass G. Further, a spring (not shown) is stretched between the retainer 28 and arm head 24, constantly urging the retainer 28 in a direction of the wiping object surface of the windshield glass G. Further, an arm piece 32 forming the wiper arm 12 together with the retainer 28 is fixed to a front end portion of the retainer 28. A front end portion of the arm piece 32 is bent in the form of a substantially U shape, acting as a holding portion 34. The holding portion 34 holds the wiper blade 36 via a clip member (not shown).

As described above, the wiper device 10 includes the wiper arm 12 of a four-articulation link system. If the main lever 14 rotates with the pivot shaft 18, the arm head 24 linked with the sub lever 16 rotates such that it approaches or leaves with respect to the pivot shaft 18. Consequently, the entire length of the wiper arm 12 extends or contracts (the supporting position of the arm head 24 shifts so that the entire length apparently extends or contracts).

Further, a cover member 40 is mounted on the arm head 24.

Figure 1:
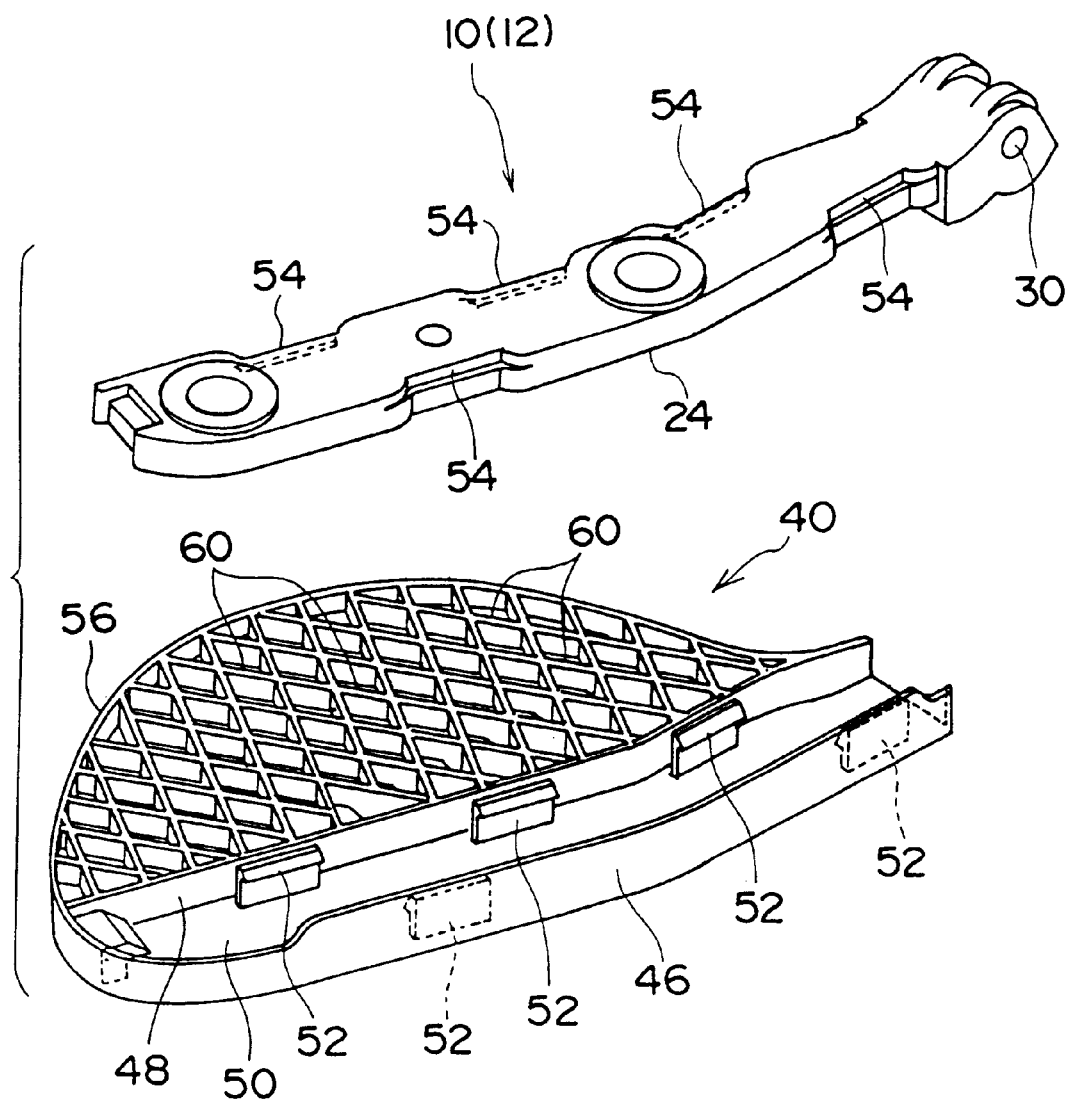
FIG. 1 is a perspective view showing a structure of an arm head and a cover member of a wiper device according to a first embodiment of the present invention.
Figure 2:
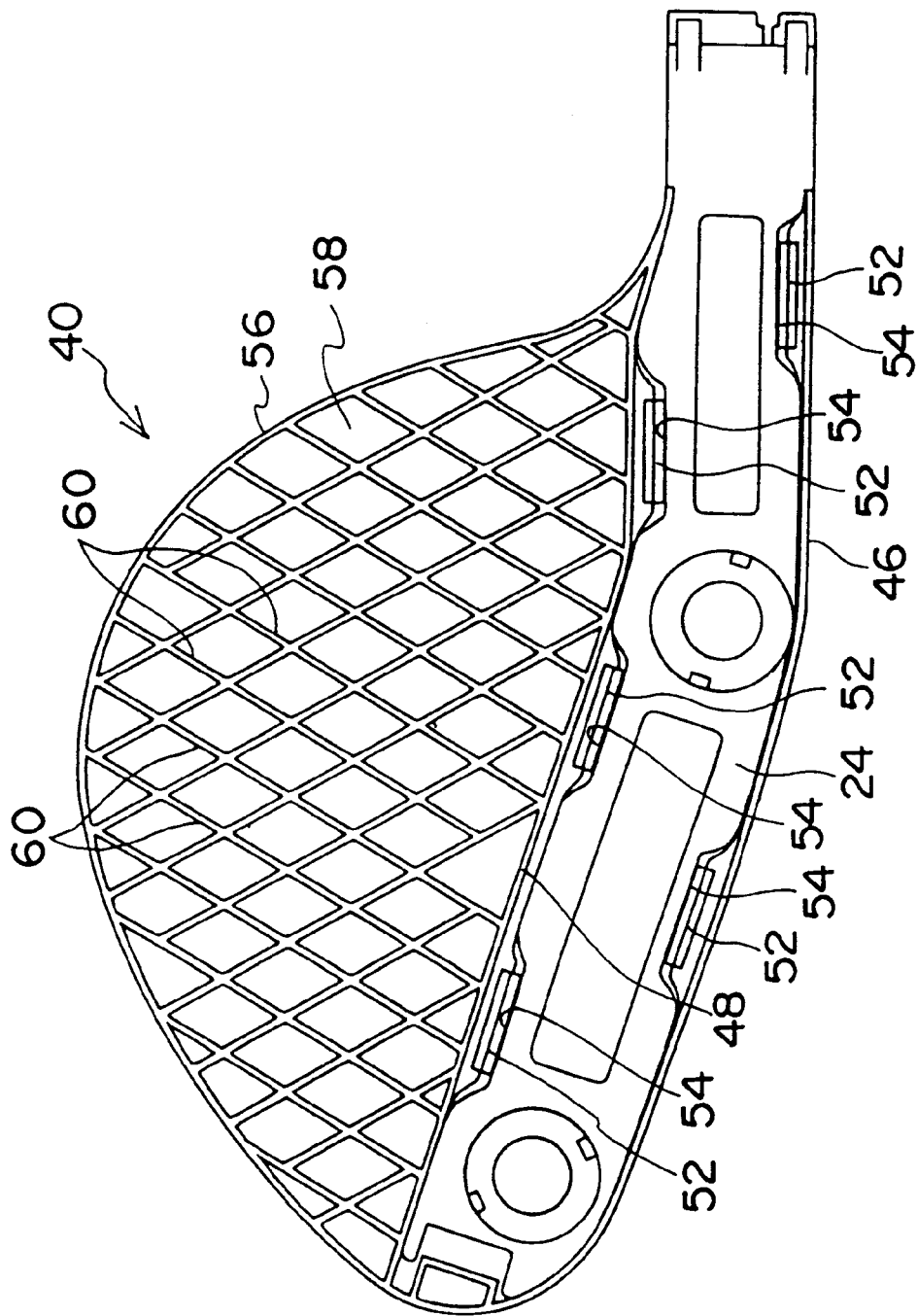
FIG. 2 is a back side view showing a structure of the arm head and the cover member of the wiper device according to the first embodiment of the present invention.
Figure 3:
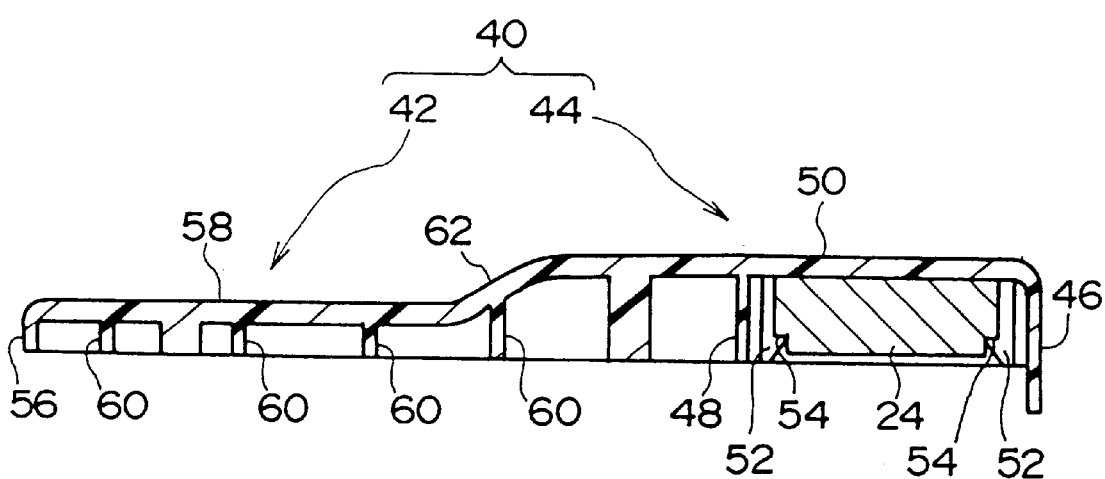
FIG. 3 is a sectional view showing a structure of the arm head and the cover member of the wiper device according to the first embodiment of the present invention.

FIG. 1 shows structures of the cover member 40 and the arm head 24 in a perspective view as viewed from their back sides if the view of FIG. 4 is assumed to be front side. FIG. 2 shows the back sides of the structures of the cover member 40 and arm head 24 and FIG. 3 shows sectional views of the structures of the cover member 40 and arm head 24.

The cover member 40 is formed of a resin substantially in the form of a fan and comprises a first cover portion 42 and a second cover portion 44.

The second cover portion 44 provides a peripheral wall 46 and a top wall 50. Further, at a proximal end of the second cover portion 44 is formed a peripheral wall 48 opposing the peripheral wall 46, so that a portion between the peripheral wall 46 and peripheral wall 48 is a portion to be mounted at the arm head 24. A plurality of engaging pieces 52 is formed at that portion. These engaging pieces 52 are provided so as to be upright and separate from the peripheral walls 46, 48 at positions that are inward with respect to the peripheral walls 46, 48 by a predetermined distance. These engaging pieces 52 engage with each of engaging concave portions 54 formed in the arm head 24. The engaging concave portions 54 of the arm head 24 are provided such that they do not oppose each other but are in a staggered arrangement. Correspondingly therewith, the engaging pieces 52 of the cover member 40 are also provided in a staggered arrangement.

If these engaging pieces 52 engage with the engaging concave portions 54, movement of the cover member 40 in the longitudinal direction and transverse direction is blocked so that the cover member 40 is fixed to the arm head 24.

On the other hand, the first cover portion 42 provides a peripheral wall 56 continuous with the peripheral wall 46 and a top wall 58 continuous with the top wall 50. The first cover portion 42 is extended continuously from the second cover portion 44 in the form of a fan. Further, a step portion 62 is provided between the first cover portion 42 and the second cover portion 44. That is, the step portion 62 is provided on a border between the top wall 50 and the top wall 58, so that the first cover portion 42 and the second cover portion 44 are formed so as to be continuous with each other through the step portion 62.

A mesh-like rib 60 is formed at the back side of the first cover portion 42 and a part of the back side of the second cover 44 so as to strengthen the rigidity of the first cover portion 42 and the second cover portion 44.

The cover member 40 having such a structure is put on the arm head 24 from above and fixed thereto. In a state in which the device is stopped, the first cover portion 42 overlaps a lower portion of an engine hood F (see FIG. 5) so as to cover traveling ranges of the main lever 14 and the sub lever 16. Further, the second cover portion 44 extends beyond the engine hood F, thereby covering, together with the first cover portion 42, the arm head 24 and the traveling range of the main lever 14 and the sub lever 16 ( shaded area A in FIG. 4 ). Therefore, in a state in which the cover member 40 is put on the arm head 24, the link mechanism comprising the main lever 14, the sub lever 16 and the like is not exposed to the outside.

In this cover member 40, in a state in which the device is stopped a gap between the first cover portion 42 and the engine hood F is set due to the step portion 62.

Further, in the state in which the wiper device is stopped, the second cover portion 44 is set to be flush with the surface of the engine hood F at substantially the same height, as illustrated in FIG. 6.

Next, an operation of the first embodiment will be described below.

In the wiper device 10 of a vehicle employing the wiper arm 12, with a rotation of the pivot shaft 18, the wiper arm 12 and wiper blade 36 rotate by reciprocation so as to wipe off rain drops and the like on the windshield glass.

In this case, when the main lever 14 rotates with the pivot shaft 18, the sub lever 16 for restricting a movement of the arm head 24 following the rotating operation of the main lever 14 makes the arm head 24 rotate such that it approaches or leaves with respect to the pivot shaft 18. As a result, the entire length of the wiper arm 12 extends or contracts (the supporting position of the arm head 24 shifts thereby extending or contracting the entire length of the wiper arm). Consequently, the entire length of the wiper arm apparently extends or contracts at a predetermined wiping position so as to expand the wiping range. Therefore, as compared to a wiper device having an ordinary wiper arm, the wiper arm of this invention is unlikely to produce unwiped portions in the entire range of the windshield glass.

In this wiper device 10, the cover member 40 is integrally provided on the arm head 24. In this cover member 40, the first cover portion 42 overlaps with the lower portion of the engine hood F so as to cover the traveling ranges of the main lever 14 and the sub lever 16. Further, the second cover portion 44 extends beyond the engine hood F so as to cover the arm head 24 and the traveling range of the main lever 14 and the sub lever 16.

Thus, in cases in which snow, ice or the like drops on the traveling range of the link mechanism comprising the main lever 14, the sub lever 16 and the arm head 24, the cover member 40 prevents them from adhering or remaining. Therefore, a smooth operation of the link mechanism or the wiper device is prevented from being hampered. Particularly, foreign matter such as a bough is prevented from entering into the traveling range of the aforementioned link mechanism unexpectedly.

Further, the cover member 40 has the step portion 62 such that it is formed with a step with respect to the first cover portion 42 so that the second cover portion 44 is flush with the surface of the engine hood F of a vehicle at substantially the same height. Therefore, the gap relative to the engine hood F of the vehicle is further reduced (this is also a simple labyrinth). Particularly when the wiper device is stopped, snow, ice or the like on the cover member 40 falls continuously to the engine hood side flush with the second cover portion 44, thereby preventing snow, ice or other foreign matter from entering the gap between the engine hood F of the vehicle and the cover member 40.

Further, as described above, in the state in which the wiper device is stopped, the gap between the first cover portion 42 and the engine hood F is set by the step portion 62. Therefore, even in a case wherein the four-articulation link system is applied to a vehicle of a different type (i.e., a vehicle having a different engine hood size or shape), by setting a formation position of the step portion 62 on the cover member 40 and a height thereof in a preferable manner, it is possible to prevent foreign matter from entering in between the engine hood F and the four-articulation link system and to prevent snow, ice or the like from remaining.

The cover member 40 is fixed to the arm head 24 in a state in which the engaging pieces 52 engage with the engaging concave portions 54 formed in the arm head 24, thereby preventing movement of the arm head 24 in the longitudinal direction and transverse direction. Therefore, since the cover member 40 can be mounted in an easy operation, assembly work efficiency can be improved. Further, because the engaging pieces 52 are disposed so as to be upright at positions set apart from the peripheral walls 46 and 48 by a predetermined distance in this case, when the cover member 40 is installed, the engaging pieces 52 are deformed easily and engage with the engaging concave portions 54. Thus, the assembly performance of the cover member 40 is improved further.

Further, because the plurality of the engaging concave portions 43 formed in the arm head 24 are provided such that they do not oppose each other but are in a staggered arrangement, the dimensions of the thickness necessary for the engaging concave portions 54 and the engaging pieces 52 can be secured easily thereby improving freedom of design.

Further, because the mesh-like ribs 60 are formed at the back side of the first cover 42 and at part of the back side of the second cover 44 of the cover member 40, the rigidity of the cover member 40 is improved. Further, if snow is accumulated or ice is formed in the vicinity of the aforementioned link mechanism under the bottom end of the engine hood F of the vehicle, the cover member 40 having the aforementioned high rigidity rotates (the wiper device 10 is actuated) so as to remove (scrape off) the accumulated snow or the like by force, thereby preventing increase of such accumulated snow.

For this reason, a case in which the cover member 40 is pushed up from its back side by accumulated snow, ice or the like never occurs. Thus, the engagement between the engaging piece 52 and the engaging concave portion 54 in the arm head 24 is never released, so that the cover member 40 never slips out with respect to the arm head 24 unexpectedly.

As described above, in the wiper device 10 according to the first embodiment, it is possible to prevent snow, ice or the like from remaining in the aforementioned link mechanism of the wiper arm 12 of the four-articulation link system comprising the main lever 14, the sub lever 16 and the arm head 24 connected therewith, or to prevent accumulated snow from increasing or foreign matter from entering therein. Further, because the cover member 40 is a simple structure provided on the arm head 24, production costs are low. Further, this cover member 40 never slips out unexpectedly.

Although according to the first embodiment, the step portion 62 is provided substantially in the center of the cover member 40, the present invention is not restricted to this example, and it is permissible to provide the step portion 62 at any position. In other words, the first cover portion 42 and second cover portion 44 are provided so as to be continuous with each other, with the step portion 62 therebetween.

Figure 7:
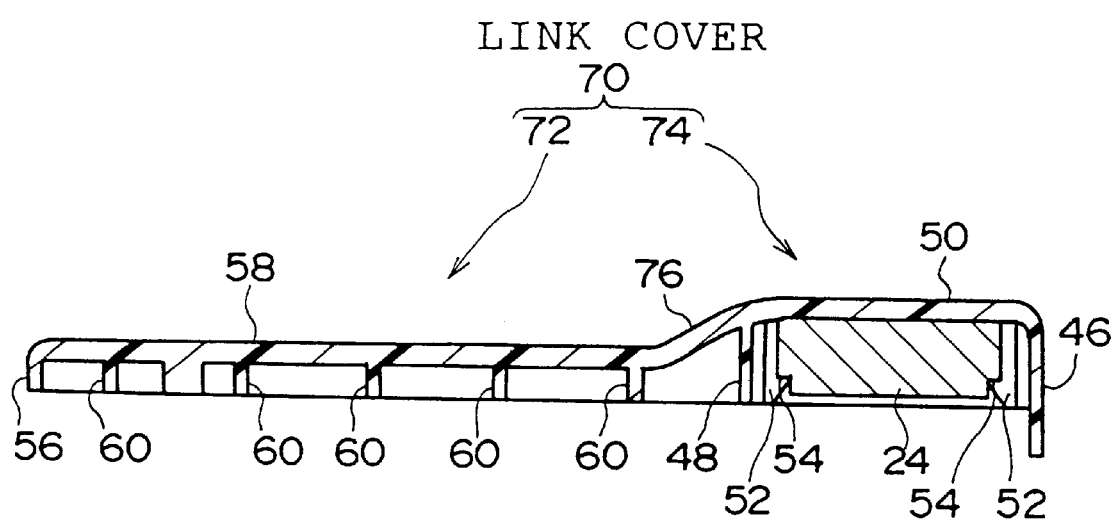
FIG. 7 is a sectional view showing a modification of the cover member of the wiper device according to the first embodiment of the present invention.

For example, it is permissible to provide the step portion 76 near the rear end in an extending direction (a position near a portion to be mounted at the arm head 24 at which the engaging piece 52 is formed) like the cover member 70 shown in FIG. 7 so that the first cover portion 72 is set so as to be larger than the second cover portion 74. On the contrary, it is also permissible to provide the step portion 76 near the front end in the extending direction (a position set apart from the portion to be mounted at the arm head 24) so that the first cover portion 72 is set so as to be smaller than the second cover portion 74.

Further, although in the first embodiment, the second cover portion protrudes with respect to the first cover portion as indicated in the cover member 40 of FIG. 6, the present invention is not restricted to this structure, and it is permissible for the first cover portion to protrude from the second cover portion.

Next, a second embodiment of the present invention will be described. This is a modification of the cover member of the first embodiment.

The same reference numerals as the first embodiment are attached to basically the same components as the first embodiment, and a description thereof is omitted.

Figure 8:
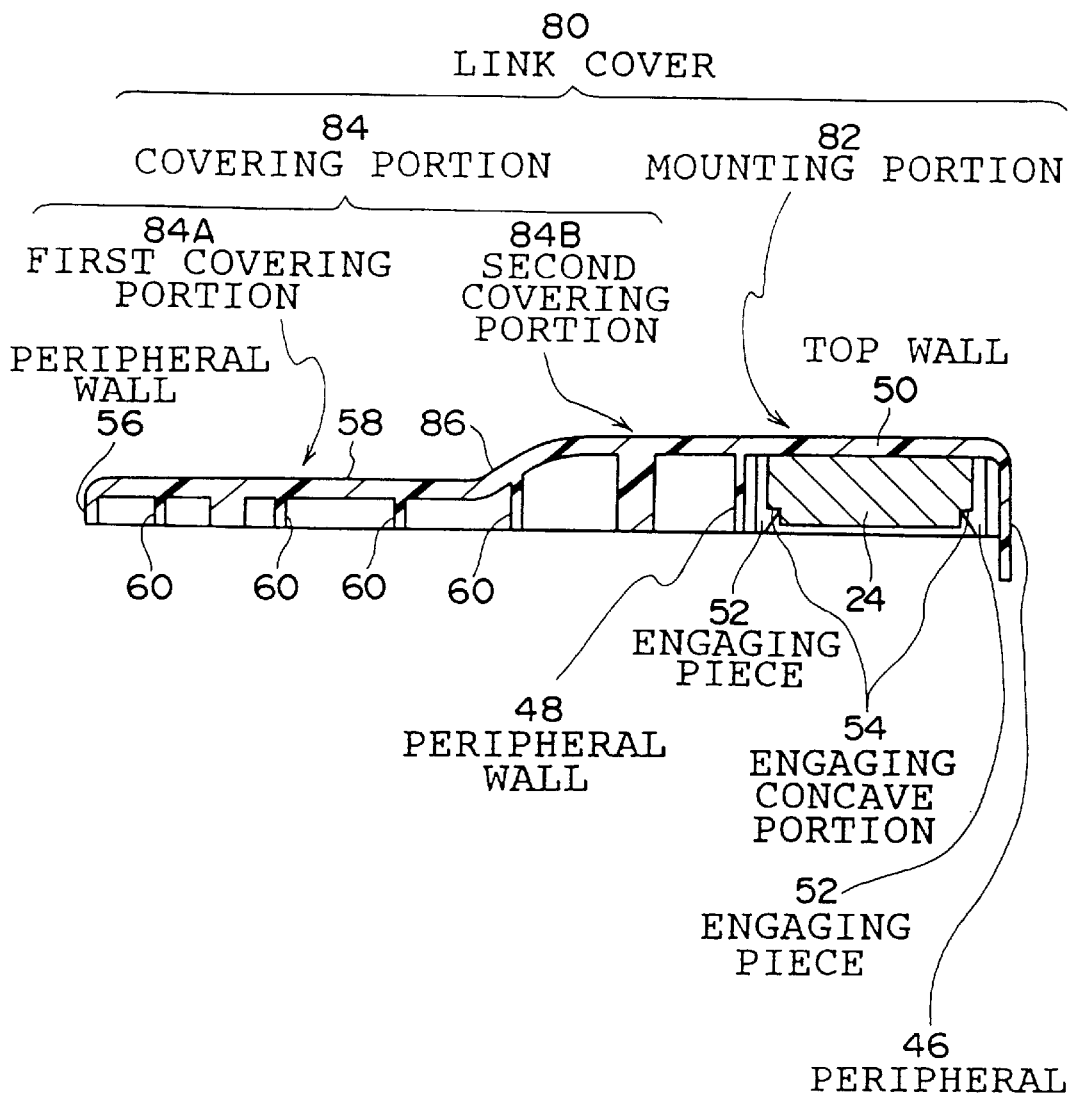
FIG. 8 is a sectional view showing a structure of the arm head and the cover member of the wiper device according to a second embodiment of the present invention.

FIG. 8 shows a structure of the cover member 80 applied to the wiper device of a vehicle according to the second embodiment of the present invention in a sectional view.

The cover member 80 is formed of a resin substantially in the form of a fan like the cover member 40 according to the first embodiment and comprises a mounting portion 82 and a covering portion 84.

The mounting portion 82 is formed having a cross section with a U shape, one end of which is open, which is formed by a pair of peripheral walls 46, 48 and a top wall 50 continuing between top ends of the peripheral walls 46 and 48, which correspond to the arm head 24. Further, a plurality of the engaging pieces 52 are formed on the mounting portion 82. These engaging pieces 52 are provided so as to be upright at positions set apart from the peripheral walls 46, 48 by a predetermined distance and structured so as to engage with the engaging concave portions 54 formed in the arm head 24. Further, a plurality of the engaging pieces 54 on the arm head 24 are provided in the transverse direction of the arm head 24 such that they do not oppose each other and are a staggered arrangement. Correspondingly therewith, the engaging pieces 52 on the cover member 80 are provided on the mounting portion 82 in a staggered arrangement.

If the engaging pieces 52 engage with the engaging concave portions 54, the cover member 80 is fixed to the arm head 24 such that movement of the cover portion 80 (mounting portion 82) in the longitudinal direction and transverse direction is blocked.

On the other hand, the covering portion 84 is extended in the form of a fan that is continuous with the mounting portion 82 (peripheral wall 48) and comprises the peripheral wall 56 continuous with the peripheral wall 48 and a top wall 58 continuous with the top wall 50. The top wall 58 is formed so as to have a step through a step portion 86. The front side in the extending direction relative to the step portion 86 (the side near the engine hood F) is a first covering portion 84A, and the rear side relative to the step portion 86 is a second covering portion 84B. That is, the mounting portion 82 and the covering portion of the cover member 80 are continuous with each other and their top portions (top wall 50 and top wall 58) are formed so as to be continuous, having the step portion 86.

Further, a mesh-like rib 60 is formed at the back side of the covering portion 84 (the first cover portion 84A and the second cover 84B) so as to strengthen the rigidity of the covering portion 84.

In the cover member 80 having such a structure, the mounting portion 82 covers the arm head 24 from above and is fixed thereto and the covering portion 84 is extended to just above the aforementioned main lever 14 and the sub lever 16. In a state in which the device is stopped, the covering portion 84 (first covering portion 84A) of the cover member 80 overlaps a lower portion of the engine hood F. (see FIG. 5) so as to cover the main lever 14 and the sub lever 16. Further, the mounting portion 82 and the second covering portion 84B of the covering portion 84 extend out from the engine hood F, thereby covering the arm head 24, the main lever 14 and the sub lever 16. Therefore, in a state in which the cover member 80 covers the arm head 24, the link mechanism comprising the main lever 14, the sub lever 16 and the like is not exposed to the outside.

In this cover member 80, in the state in which the device is stopped a gap between the first cover portion 84A of the covering portion 84 and the engine hood F is set by the step portion 86.

Further, in the state in which the wiper device is stopped, the second cover portion 84B of the covering portion 84 and mounting portion 82 are set so as to be flush with the surface of the engine hood F at substantially the same height.

Next, an operation of the second embodiment will be described.

In the wiper device of a vehicle using the cover member 80 having the aforementioned structure, the covering portion 84 of the cover member 80 is extended toward just above the main lever 14 and sub lever 16. In the state in which the wiper device is stopped, the first covering portion 84A overlaps the lower portion of the engine hood F so as to cover the main lever 14 and the sub lever 16. The second covering portion 84B and mounting portion 82 extend beyond the engine hood F of the vehicle so as to cover the arm head 24, the main lever 14 and the sub lever 16. Therefore, the same operation as in the first embodiment is ensured.

Although according to the aforementioned second embodiment, the covering portion 84 of the cover member 80 is provided with the step portion 86 and the front side in the extending direction relative to the step portion 86 is named as the first covering portion 84A and the rear side relative to the step portion 86 is named as the second covering portion 84B, the formation position of this step portion 86 is not restricted to this position, and the step portion 86 may be provided on a border between the mounting portion 82 and the covering portion 84 or at the mounting portion 82. That is, the requirement on the cover member 18 is that the mounting portion 82 and covering portion 84 of the cover member 80 is formed so as to be continuous with each other, through the step portion 86.

Next, a third embodiment of the present invention will be described. This indicates another example of the cover member fixing structure in the first embodiment.

The same reference numerals as in the first and second embodiments are attached to the same components as the first and second embodiments of the present invention and a description thereof is omitted.

Figure 9:
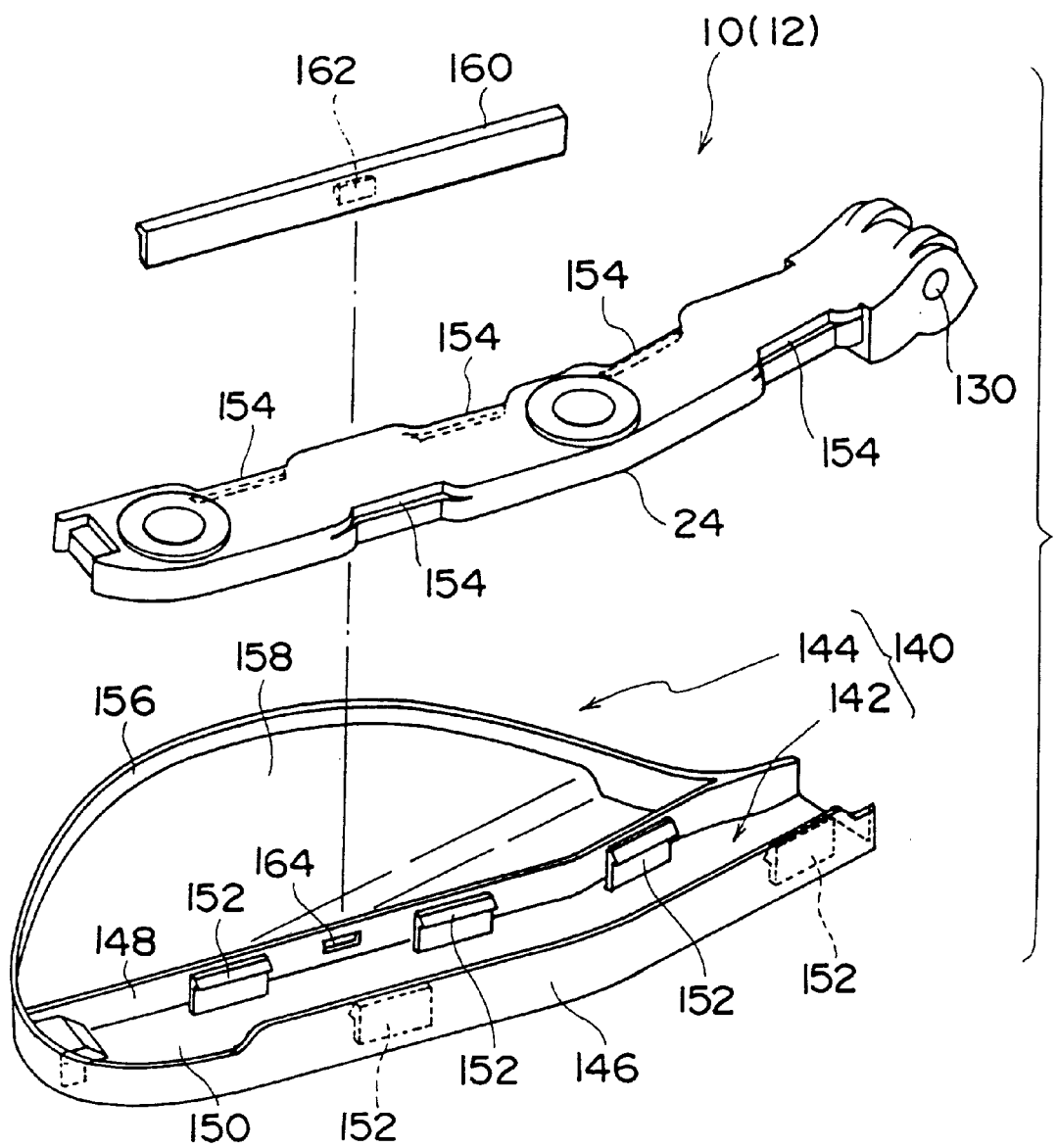
FIG. 9 is a perspective view showing a structure of the arm head, the link cover and peripheral parts of the wiper device according to a third embodiment of the present invention.
Figure 10:
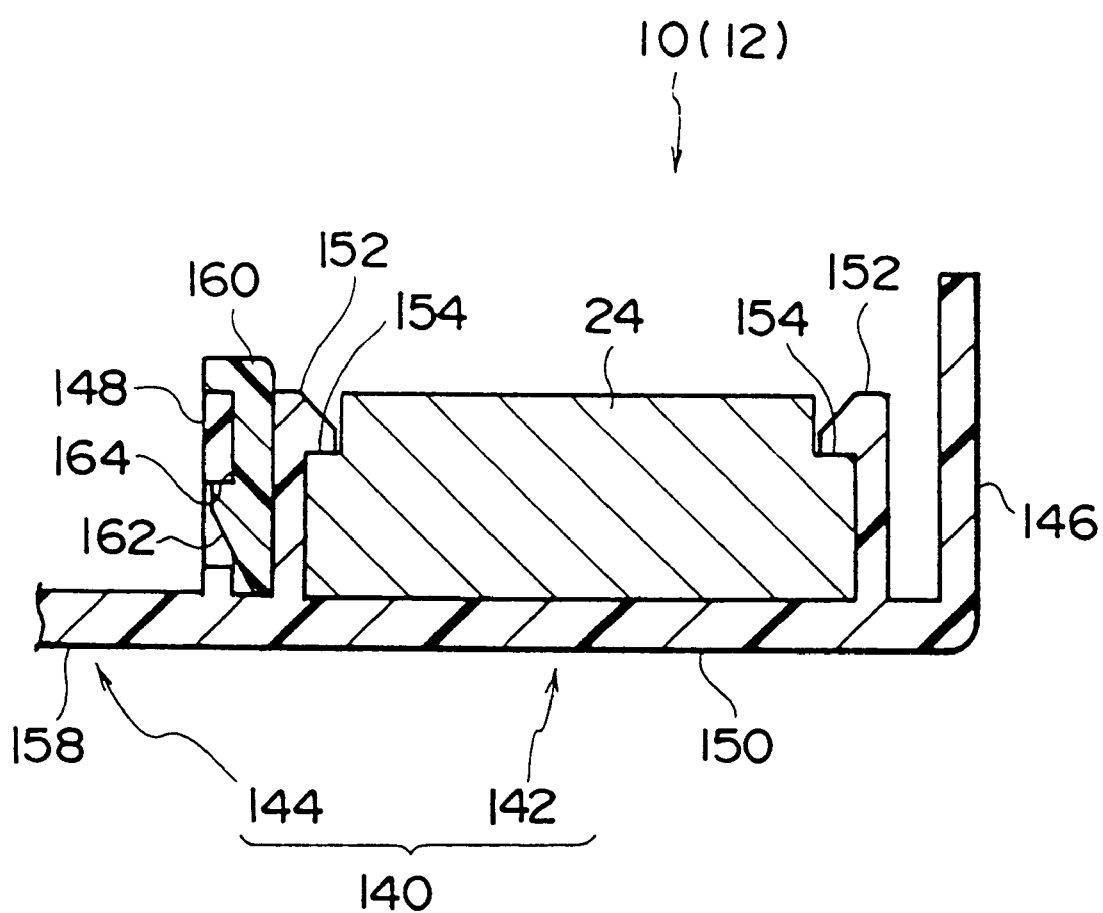
FIG. 10 is a sectional view showing a structure of the arm head, the link cover and the peripheral parts of the wiper device according to the third embodiment of the present invention.

FIG. 9 is a perspective view of the structures of a link cover 140 and the arm head 24 according to the third embodiment of the present invention. FIG. 10 is a sectional view of the link cover 140 and the arm head 24. In FIGS. 9 and 10, the top in a vertical direction is the reverse of that of FIG. 4.

The link cover 140 is formed of resin a substantially in the form of a fan and comprises a mounting portion 142 and a covering portion 144. The mounting portion 142 is formed having a U-shaped cross section one end of which is open, which is formed by a pair of peripheral walls 146, 148 which oppose each other and a top wall 150 continuing between the top portions of the peripheral walls 146 and 148, corresponding to the arm head 24. Further, a plurality of the engaging pieces 152 are formed on the mounting portion 142. These engaging pieces 152 are provided so as to be erect at positions set apart from the peripheral walls 146, 148 by a predetermined distance and structured so as to engage with the engaging concave portions 154 formed in the arm head 24. A plurality of the engaging concave portions 154 of the arm head 24 are provided such that they do not oppose each other in the transverse direction of the arm head 24 and are in a staggered arrangement. Correspondingly, the engaging pieces 152 of the link cover 140 are provided on the mounting portion 142 in a staggered arrangement as well.

If the engaging pieces 152 engage with the engaging concave portions 154, the link cover 140 (mounting portion 142) is fixed to the arm head 24 such that movement thereof in the longitudinal direction and transverse direction is blocked.

On the other hand, the covering portion 144 is extended in the form of a fan that is continuous with the mounting portion 142 (peripheral wall 148) and comprises the peripheral wall 156 continuous with the peripheral wall 148 and a top wall 158 continuous with the top wall 150.

In the link cover 140 having such a structure, the mounting portion 142 covers the arm head 24 from above and is fixed thereto and the covering portion 44 is extended to just above the main lever 14 and the sub lever 16 (it is located outside the vehicle with respect to the main lever 14 and the sub lever 16), covering the link mechanism comprising the main lever 14, the sub lever 16 and the like.

Further, the link cover 140 (covering portion 144) is so designed in terms of dimension and shape so as to cover at least a covering range not covered by the engine hood F (see FIG. 5) of the vehicle in the traveling range of the main lever 14 and the sub lever 16. Therefore, in the state in which the link cover 140 is attached to the arm head 24, the link mechanism comprising the main lever 14, the sub lever 16 and the like is not exposed to the outside.

The link cover 140 (arm head 24) having such a structure is provided with a spacer stopper 160 as a stopper member. The spacer stopper 160 is formed entirely in the form of a thin plate and is mounted firmly between the engaging pieces 152 located on the side of the peripheral wall 148 (covering portion 144) of the plurality of the engaging pieces 152 and the peripheral wall 148.

Further, a pawl portion 162 is formed at one side surface of the spacer stopper 160 and is capable of being fit into an engaging hole 164 formed in the peripheral wall 148. That is, by fitting the pawl portion 162 to the engaging hole 164, the spacer stripper 160 is integrally fixed to the mounting portion 142 of the link cover 140.

Next, an operation of the third embodiment will be described.

Because the spacer stripper 160 is integrally fixed to the mounting portion 142 of the link cover 140 (prevented from becoming loose) by fitting the pawl portion 162 formed on the side surface thereof into the engaging hole 164 formed on the peripheral wall 148, this spacer stopper never slips out unexpectedly. Therefore, the fixed state of the link cover can be maintained securely.

Next, a fourth embodiment of the present invention will be described. This indicates another example of the cover member fixing structure in the first embodiment.

The same reference numerals as in the first, second, and third embodiments are attached to the same components as in the first, second, and third embodiments of the present invention and a description thereof is omitted.

Figure 11:
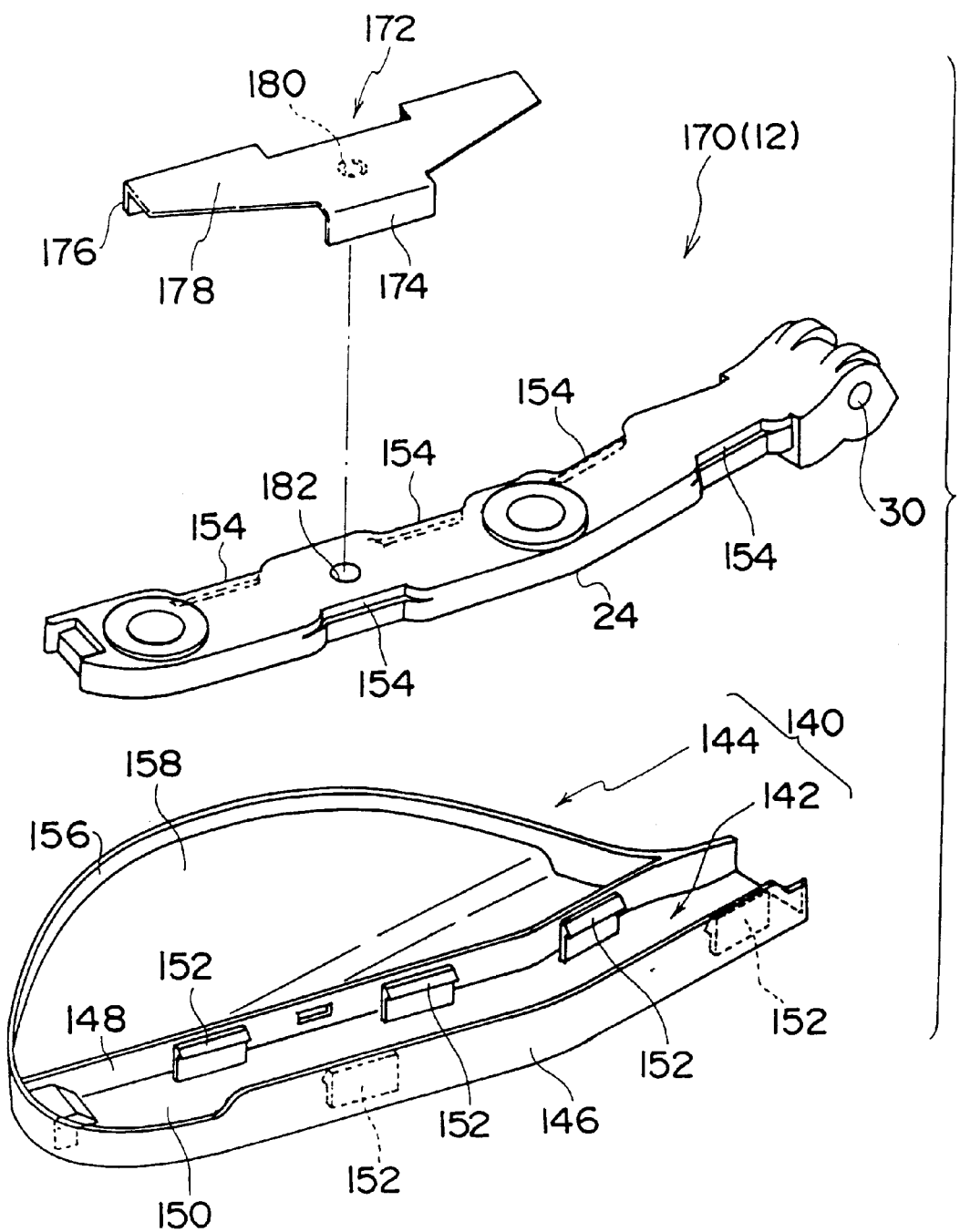
FIG. 11 is a perspective view showing a structure of the arm head, the link cover and the peripheral parts of the wiper device according to a fourth embodiment of the present invention.
Figure 12:
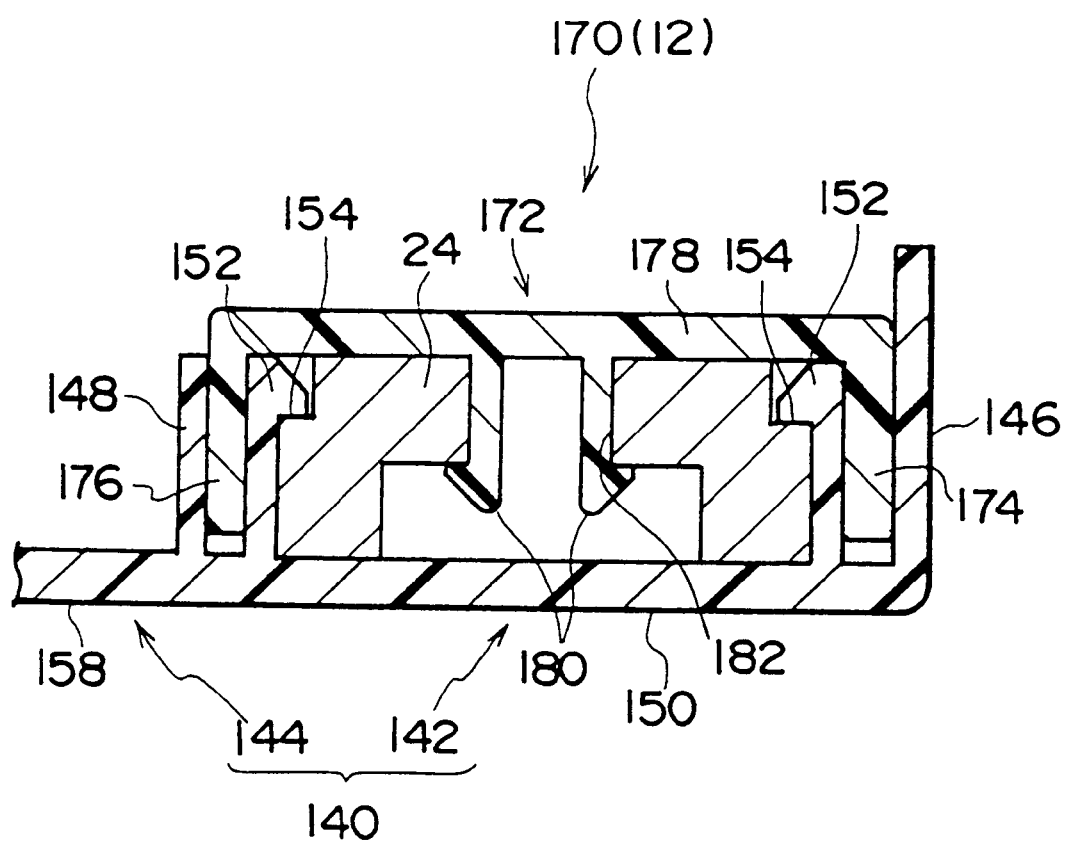
FIG. 12 is a sectional view showing a structure of the arm head, the link cover and the peripheral parts of the wiper device according to the fourth embodiment of the present invention.

FIG. 11 is a perspective view of the structures of the link cover 140 and the arm head 24 of a wiper device 170 of a vehicle according to the fourth embodiment of the present invention. FIG. 12 is a sectional view of that portion.

Although in this wiper device 170, the structures of the arm head 24, the link cover 140 and the like are the same as in the third embodiment, a pinching stopper 172 is provided as a stopper means on the link cover 140 (arm head 24) instead of the spacer stopper 160.

The pinching stopper 172 is formed so as to have a substantially U-shaped cross section by bending a thin plate, and comprises a pair of fitting portions 174, 176 and a link portion 178 for linking these fitting portions 174, 176. One side i.e., the fitting portion 176 is firmly mounted between the peripheral wall 148 and the engaging pieces 152 located at the side of the peripheral wall 148 (covering portion 144) of the plurality of the engaging pieces 152. On the other hand, the other side, i.e., the fitting portion 174, is firmly mounted between the peripheral wall 146 and the engaging pieces 152 located at the side of the peripheral wall 146 (an opposite side with respect to the covering portion 144). Therefore, this pinching stopper 172 is structured so as to pinch the respective engaging pieces 152 located on both sides of the arm head 24 integrally with the arm head 24.

A pawl protrusion 180 is formed on the link portion 178 of the pinching stopper 172 and is capable of being fit into an engaging hole 182. That is, by fitting the pawl protrusion 180 into the engaging hole 182, the pinching stopper 172 is integrally fixed to the arm head 24.

In the above described respective embodiments, by fitting the engaging pieces 152 formed on the mounting portion 142 of the link cover 140 to the engaging concave portions 154 formed in the arm head 24, the link cover 140 (the mounting portion 142) is fixed to the arm head 24. However, this invention is not restricted to this example and it is permissible to use other fixing means at the same time.

Figure 13:
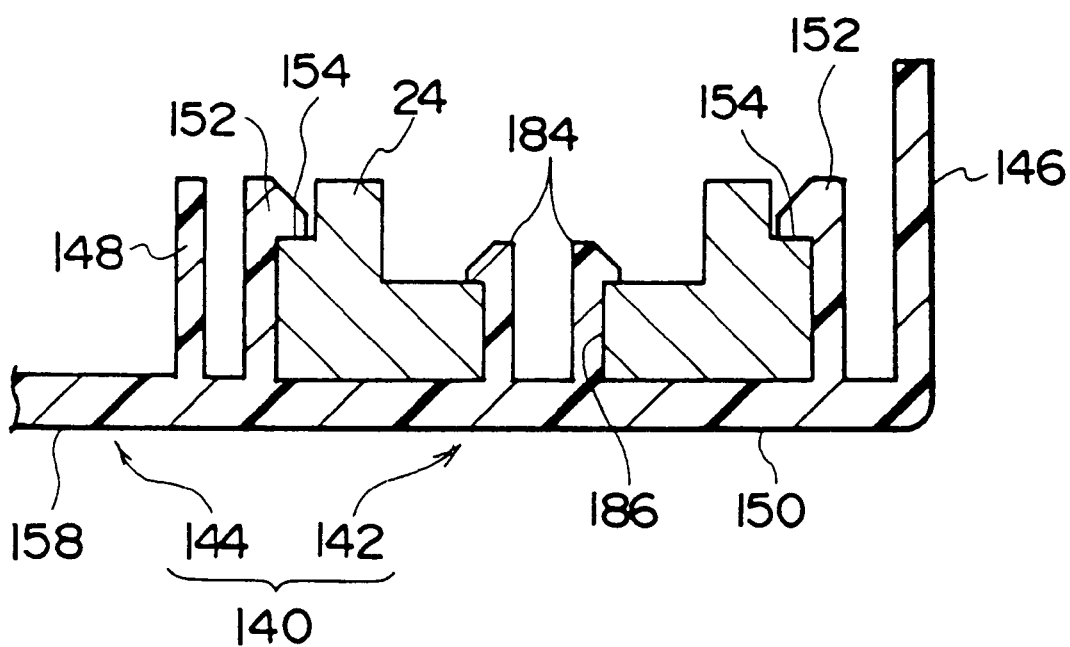
FIG. 13 is a sectional view showing other fixing means for the arm head and the link cover of the wiper device according to an embodiment of the present invention.

For example, as shown in FIG. 13, it is permissible that pawl protrusions 184 are formed on the mounting portion 142 (top wall 150) of the link cover 140 and that these pawl protrusions 184 are inserted into engaging holes 186 formed in the arm head 24 so as to integrally fix the link cover 140 to the arm head 24 (prevent from becoming loose). In this case, the fixed state of the link cover 140 can be maintained more securely.

Further, although according to the above described respective embodiments, the engaging pieces 152 (engaging concave portions 154 formed in the arm head 24) formed on the mounting portion 142 of the link cover 140 are provided in the transverse direction of the arm head 24 in the staggered arrangement such that they do not oppose each other, the arrangements of the engaging pieces 152 and the engaging concave portions 154 are not restricted to this staggered arrangement. The requirement with respect to the arrangement of the engaging pieces 152 and the engaging concave portions 154 is that they are arranged on both sides in the transverse direction of the arm head 24 such that they do not oppose each other.

Next, a fifth embodiment of the present invention will be described.

The same reference numerals as in the first to the fourth embodiments are attached to the same components as in the first to the fourth embodiments of the present invention and a description thereof is omitted.

Figure 14:
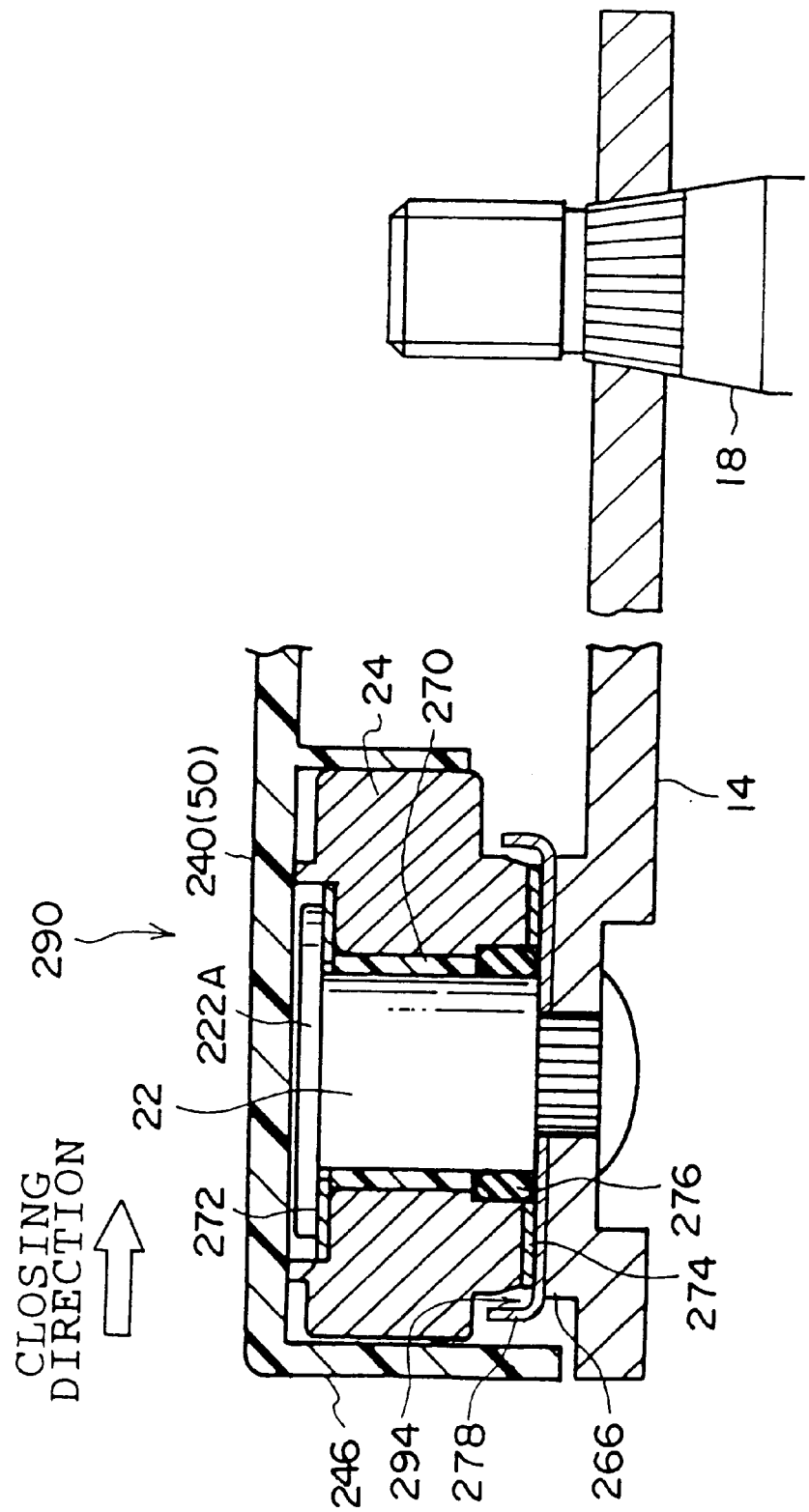
FIG. 14 is a sectional view showing a structure of a linked rotation portion between the arm head and the main lever of the wiper device according to a fifth embodiment of the present invention.
Figure 15:
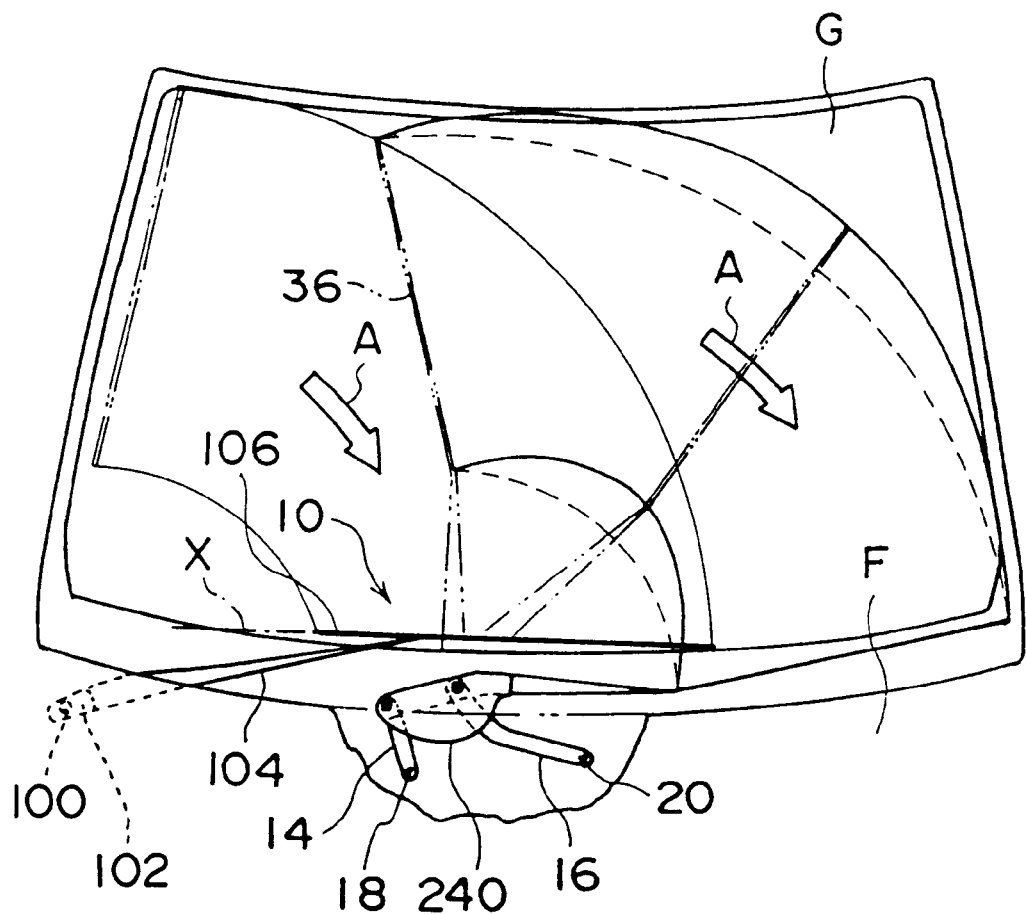
FIG. 15 is a front view showing a state in which the wiper device according to the fifth embodiment of the present invention is applied to a vehicle.

FIG. 14 is a sectional view showing the detail of a linked rotation portion between the arm head 24 and the main lever 14, connected by the connecting shaft 22 of the wiper device 10 of the vehicle according to the fifth embodiment of the present invention. FIG. 15 shows a state in which this wiper device 10 is applied to the vehicle, in a front view of the vehicle.

This wiper device 10 comprises the wiper arm 12 and the wiper blade 36 held by this wiper arm 12.

On the other hand, a second pivot shaft 100 is provided as the second rotation shaft sideways in a vehicular transverse direction side of the pivot shaft 18 to support the main lever 14. This second pivot shaft 100 is linked with the pivot shaft 18 through a link rod (not shown) so that it rotates synchronously with the pivot shaft 18. Further, a secondary arm head 102 is fixed to the second pivot shaft 100 and a second wiper arm 104 is connected to this secondary arm head 102. Further, a second wiper blade 106 is connected to a front end of the second wiper arm 104.

Namely, the wiper device 10 is a so-called tandem type structure in which the two wiper arms 12, 104 (wiper blade 36 and second wiper blade 106) disposed in the transverse direction of the vehicle wipe the windshield glass.

When the second wiper blade 106 is located at a lower inverted position X, the aforementioned four-articulation link system (particularly the link portion of the main lever 14 and sub lever 16 connected by the connecting shafts 22, 26) is located in the direction in which the second wiper blade 106 closes (direction indicated by an arrow A of FIG. 5).

FIG. 14 is a sectional view of details of the linked rotation portion of the arm head 24 and the main lever 14, connected by the connecting shaft 22.

The connecting shaft 22 has an umbrella-shaped head 222A and an end thereof is fixed to the main lever 14 by crimping. A bearing 270 is provided in a connecting hole 268 in the arm head 24 and the connecting shaft 22 is supported via this bearing 270. Further, washers 272, 273 are disposed between the head portion 222A of the connecting shaft 22 and the arm head 24. A convex piece 273A is provided on part of the periphery of the washer 273 and this convex piece 273A is inserted into the concave portion 224A in the arm head 24 so as to stop rotations thereof.

On the other hand, a washer 274 is disposed between the main lever 14 and the arm head 24. Further, a seal ring 276 is provided between the connecting shaft 22 in the vicinity of the washer 274 and the arm head 24.

Further, a cup washer 278 is disposed between the main lever 14 and the washer 274. The cup washer 278 is formed in a shape of a ring such that its periphery is bent upward substantially at right angle. This cup washer 278 is nipped at its center portion between an end portion of the connecting shaft 22 fixed to the main lever 14 by crimping and the main lever 14, so that it is fixed integrally with the connecting shaft 22 and the main lever 14. This cup washer 278 forms a grease reservoir 279.

On the peripheral wall 246 (peripheral wall at the side of the second wiper arm 104) of the link cover 240 mounted on the arm head 24 is formed an extension portion 246 extending downward so as to cover the connecting shaft portion of the main lever 14 and the arm head 24, connected by the connecting shaft 22. A front end thereof reaches a portion very near a surface of the arm head 24, of the main lever 14. Consequently, the extending peripheral wall 246 (extension portion 246A) covers the connecting shaft portion of the main lever 14 and the arm head 24 connected by the connecting shaft 22.

On the peripheral wall 246 (peripheral wall at the side of the second wiper arm 104) of the link cover 240 mounted on the arm head 24 is formed an extension portion 246A extending downward so as to cover the connecting shaft portion. A front end thereof reaches a portion very near a surface of the arm head 24, of the main lever 14. Further, a step portion 266 formed by raising the connecting shaft portion of the main lever 14 toward the arm head 24 is disposed further toward the top (side of the arm head 24) with respect to the front end of the extension portion 246A of the link cover 240 such that the connecting portion enters into the link cover 240. Therefore, it is difficult for scattered rain water or muddy water to enter directly into the connecting portion, whereby waterproof performance is demonstrated.

Meanwhile the linked rotation portion between the sub lever 16 and the arm head 24 connected by the other connecting shaft 26 is of the same structure as described above. Therefore, a description thereof is omitted. Next, an operation of the fifth embodiment of the present invention will be explained.

In the wiper device 10 for a vehicle wherein a grease reservoir structure of the connecting shaft portion having the above-mentioned structure is suitable applied, the wiper arm 12 and the wiper blade 36 effect reciprocating rotation together with the rotation of the pivot shaft 18, and the second wiper arm 104 and the second wiper blade 106 effect reciprocating rotation together with the rotation of the second pivot shaft 100, thereby wiping rain drops or the like from the window shield glass surface.

Because the four-articulation link system 40 is located at the side of the closing direction of the second wiper blade 106, rain water wiped off by the second wiper,blade 106 is splashed onto this four-articulation link system 40 when wiping off rain water. However, because the four-articulation link system 40 is covered by the link cover 240 as described above, and because the peripheral wall 246 at the side of the second wiper arm is extended downward by the extension portion 246A to cover the connecting portion, a water resistance effect with respect to the splashed water is exerted. Further, because the connecting portion of the main lever 14 is contained within the link cover due to the step portion 266, the water resistance effect is further improved.

What is claimed is:

1. A wiper device of a vehicle comprising:

a first lever which is linked with a rotation shaft provided on a vehicle body and which rotates with the rotation shaft, a second lever axially supported, such that rotation is possible, by a supporting shaft provided on the vehicle body at a position set apart from the rotation shaft by a predetermined distance, a third lever linked with a distal end of the first lever and with a distal end of the second lever such that rotation is possible with respect to each and the levers form a four-articulation link system, and a wiper arm linked with the third lever and having a wiper blade connected to its distal end, the wiper device further comprising a cover member to be mounted on the third lever, and the cover member including a mounting portion to be mounted on the third lever and a covering portion which extends from the mounting portion toward just above the first lever and the second lever and at which a rib is formed at a back side thereof.

2. A wiper device of a vehicle according to claim 1, wherein said rib is formed in the form of a mesh.

3. A wiper device of a vehicle according to claim 1, wherein said cover member covers a traveling range of the first lever and the second lever and comprises a first cover portion that overlaps with a lower portion of a hood of the vehicle in a state in which the device is stopped and a second cover portion extending beyond the hood of the vehicle to cover the third lever and the traveling range of the first lever and the second lever, the first cover portion and the second cover portion being formed continuously with each other with a step portion provided therebetween, such that in a state in which the device is stopped, a gap between the first cover portion and the hood of the vehicle is set by said step portion.

4. A wiper device of a vehicle according to claim 3, wherein the second cover portion is formed with the step portion relative to the first cover portion such that in a state in which the device is stopped, the second cover portion is flush with the hood of the vehicle at substantially the same height.

5. A wiper device of a vehicle according to claim 1, wherein the cover member covers at least an uncovered range not covered by the hood of the vehicle, of the traveling range of the first lever and the second lever.

6. A wiper device of a vehicle according to claim 1, wherein the mounting portion contains a plurality of engaging pieces that elastically engage with the third lever.

7. A wiper device of a vehicle according to claim 6, wherein the plurality of the engaging pieces are disposed such that they do not oppose each other.

8. A wiper device of a vehicle according to claim 7, wherein the plurality of the engaging pieces are disposed in a staggered arrangement in a longitudinal direction of the third lever such that they do not oppose each other.

9. A wiper device of a vehicle according to claim 6, wherein the engaging pieces are provided so as to be upright and separate from ordinary peripheral walls of the mounting portion at positions that are inward with respect to the ordinary peripheral walls.

10. A wiper device of a vehicle according to claim 9 further comprising a stopper member for preventing the engaging pieces from becoming warped in such a direction that they become disengaged from the third lever.

11. A wiper device of a vehicle comprising:

a first lever which is linked with a rotation shaft provided on a vehicle body and which rotates with the rotation shaft, a second lever axially supported such that rotation is possible by a supporting shaft provided on the vehicle body at a position set apart from the rotation shaft by a predetermined distance, a third lever linked with a distal end of the first lever and with a distal end of the second lever such that each of them is rotatable and the levers form a four-articulation link system, and a wiper arm linked with the third lever and having a wiper blade connected to its distal end, the wiper device further comprising a cover member to be mounted on the third lever, the cover member comprising a first cover portion and a second cover portion, where the first cover portion covers a traveling range of the first lever and the second lever and overlaps with a lower portion of a hood of the vehicle in a state in which the device is stopped and the second cover portion extends beyond the hood of the vehicle to cover, together with the first cover portion, the third lever and the traveling range of the first lever and the second lever, and the first cover portion and the second cover portion being formed continuously with each other with a step portion provided therebetween, such that in a state in which the device is stopped, a gap between the first cover portion and the hood of the vehicle is set by the step portion.

12. A wiper device of a vehicle according to claim 11, wherein the second cover portion is formed with the step portion relative to the first cover portion such that in the state in which the device is stopped, the second cover portion is flush with the hood of the vehicle at substantially the same height.

13. A wiper device of a vehicle according to claim 11, wherein said cover member has a plurality of engaging pieces, the engaging pieces elastically engaging with the third lever so as to mount the cover member onto the third lever.

14. A wiper device of a vehicle according to claim 13, wherein the plurality of the engaging pieces are disposed in a staggered arrangement in the longitudinal direction of the third lever such that they do not oppose each other.

15. A wiper device of a vehicle according to claim 13, wherein the engaging pieces are provided so as to be upright and separate from ordinary peripheral walls of the mounting portion at positions that are inward with respect to the ordinary peripheral walls.

16. A wiper device of a vehicle according to claim 15 further comprising a stopper member for preventing the engaging pieces from becoming warped in such a direction that they become disengaged from the third lever.

17. A wiper device of a vehicle comprising:

a first lever which is linked with a rotation shaft provided on a vehicle body and which rotates with the rotation shaft, a second lever axially supported such that rotation is possible by a supporting shaft provided on the vehicle body at a position set apart from the rotation shaft by a predetermined distance, a third lever linked with a distal end of the first lever and with a distal end of the second lever such that each of them is rotatable and the levers form a four-articulation link system, and a wiper arm linked with the third lever and having a wiper blade connected to its distal end, the wiper device having a cover member including a mounting portion to be mounted on the third lever and a covering portion extending from the mounting portion toward just above the first lever and the second lever so as to cover the first lever and the second lever, and the mounting portion including a plurality of engaging pieces elastically engaging with the third lever, the engaging pieces being disposed such that they do not oppose each other.

18. A wiper device of a vehicle according to claim 17, wherein the plurality of the engaging pieces are disposed in a staggered arrangement in the longitudinal direction of the third lever such that they do not oppose each other.

19. A wiper device of a vehicle according to claim 17, wherein the engaging pieces are provided so as to be erect and separate from ordinary peripheral walls of the mounting portion at positions that are inward with respect to the ordinary peripheral walls.

20. A wiper device of a vehicle according to claim 17 further comprising a stopper member for preventing the engaging pieces from becoming warped in such a direction that they become disengaged from the third lever.

21. A wiper device of a vehicle according to claim 20, wherein said stopper member comprises:

a pair of fitting portions, one thereof being fitted in a closely contacting state in between an ordinary peripheral wall of the mounting portion and the engaging pieces located at a side of the covering positions, the other thereof being fitted in a closely contacting state in between an ordinary peripheral wall of the mounting portion and the engaging pieces located at a side opposite to the covering portion;

and a connecting portion for linking the pair of fitting portions;

said stopper member acting as a pinching stopper formed so as to have a substantially U-shaped cross section, pinching said arm head integrally with the engaging pieces.

22. A wiper device of a vehicle according to claim 17, wherein the cover member has a mesh-like rib formed at a back side thereof.

23. A wiper device of a vehicle comprising:

a first wiper comprising a first lever which is linked with a rotation shaft provided on a vehicle body and which rotates with the rotation shaft, a second lever axially supported, such that rotation is possible by a supporting shaft provided on the vehicle body at a position set apart from the rotation shaft by a predetermined distance, a third lever linked with a distal end of the first lever and with a distal end of the second lever such that rotation is possible with respect to each and the levers form a four-articulation link system, and a wiper arm linked with the third lever and having a wiper blade connected to its distal end; and a second wiper which is linked with a second rotation shaft provided on the vehicle body separately from said rotation shaft and which rotates synchronously with said rotation shaft;

the third lever of the first wiper being located in the direction in which the second wiper is closed, when the second wiper is located at a lower inverted position thereof, and a cover member being mounted on the third lever of the first wiper so as to cover the four-articulation link system, the cover member comprising an extension portion formed by extending a side wall opposing the second wiper of the cover member further than other side walls in the lower inverted position.

* * * * *